Feb. 7, 1950   M. F. ABBOTT   2,496,511
TRANSPOSING HARMONICA
Filed March 24, 1947   5 Sheets-Sheet 1
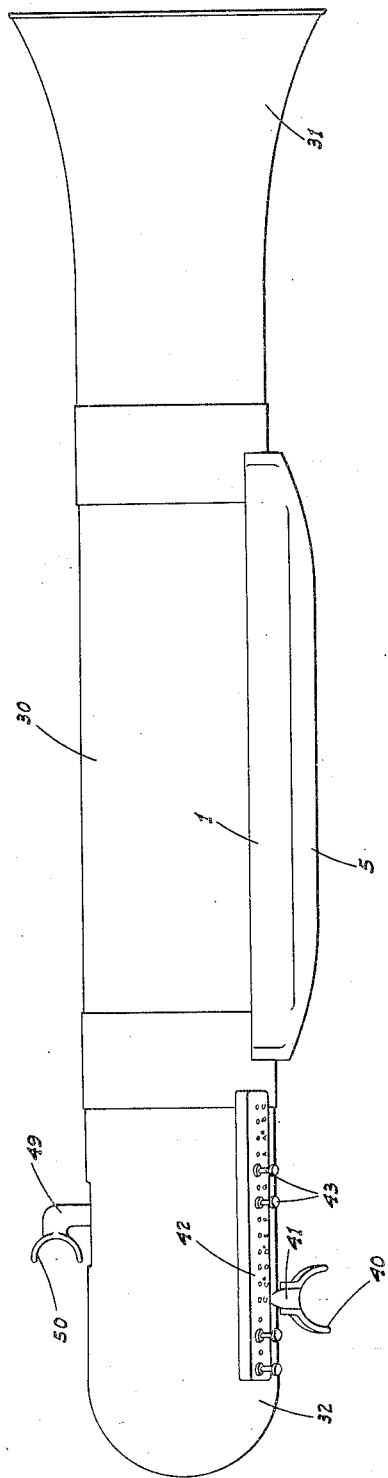
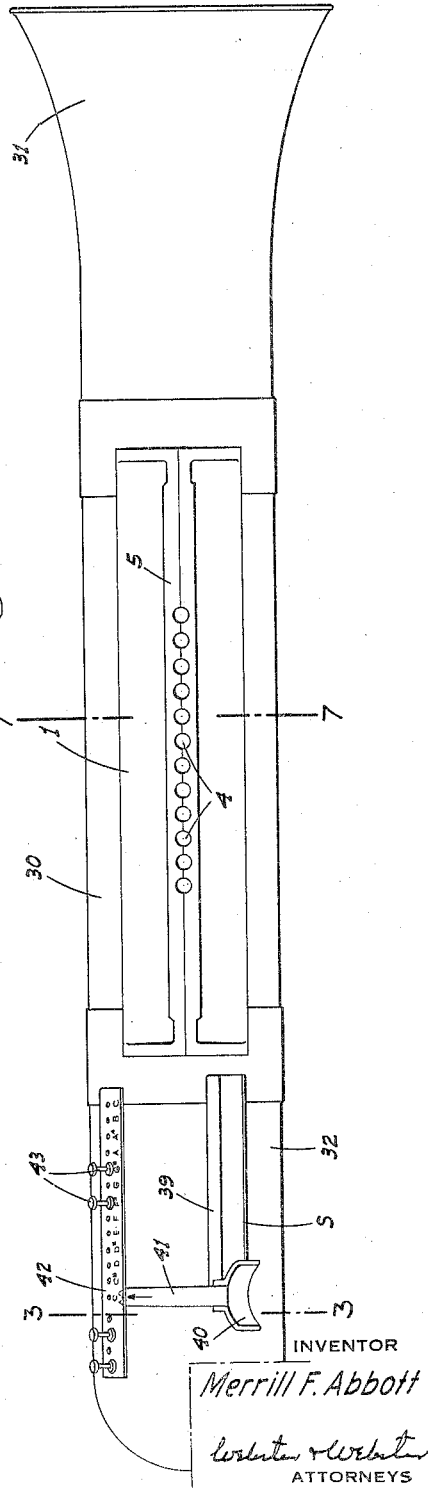
INVENTOR
Merrill F. Abbott
ATTORNEYS

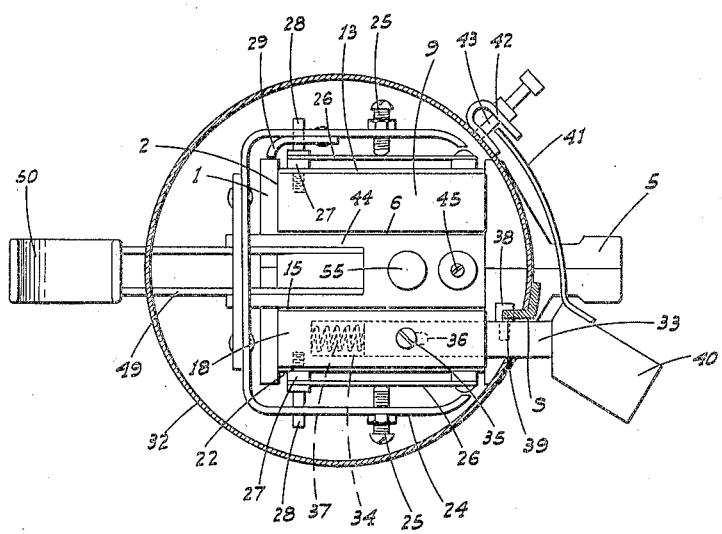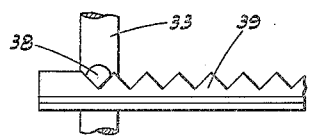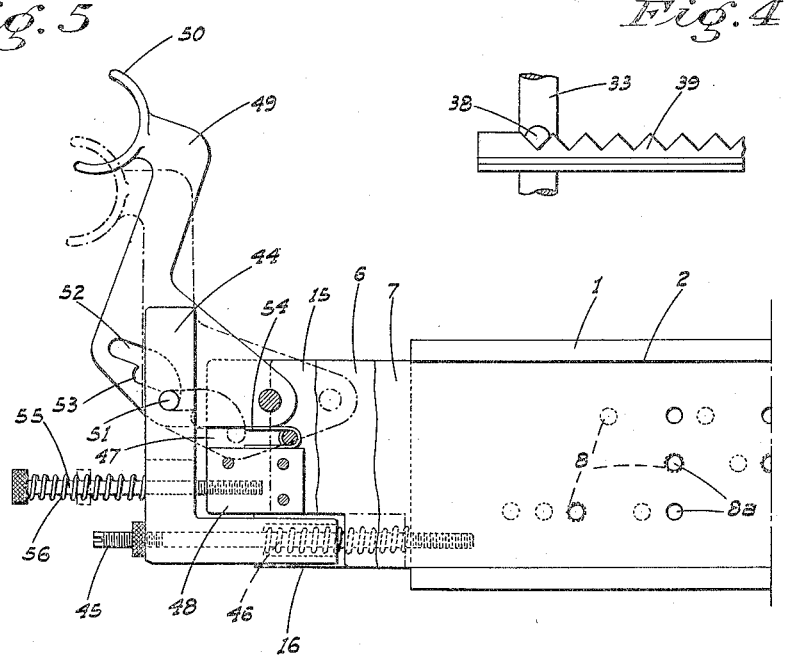

Feb. 7, 1950 — M. F. ABBOTT — 2,496,511
TRANSPOSING HARMONICA
Filed March 24, 1947 — 5 Sheets-Sheet 3
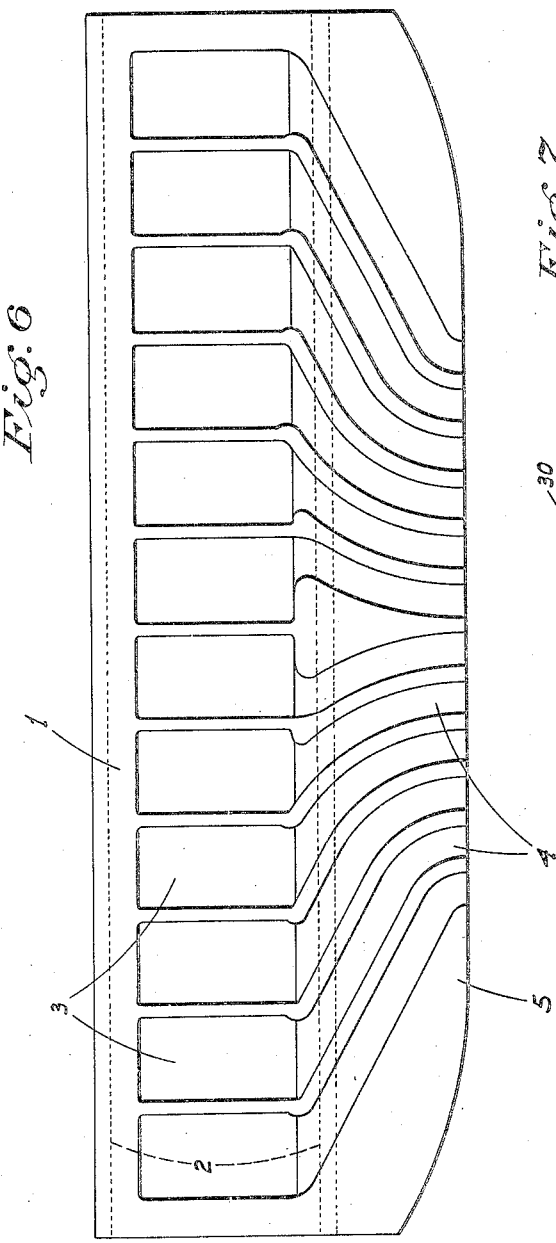
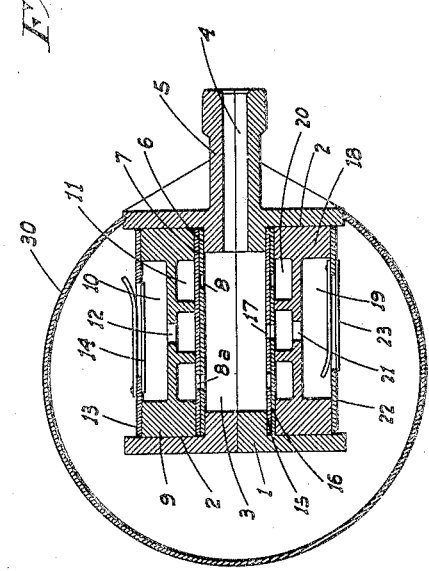
INVENTOR
Merrill F. Abbott
BY
ATTORNEYS Feb. 7, 1950 M. F. ABBOTT 2,496,511
TRANSPOSING HARMONICA
Filed March 24, 1947 5 Sheets-Sheet 4

INVENTOR
Merrill F. Abbott
BY
ATTORNEYS

Feb. 7, 1950     M. F. ABBOTT     2,496,511
TRANSPOSING HARMONICA
Filed March 24, 1947     5 Sheets-Sheet 5
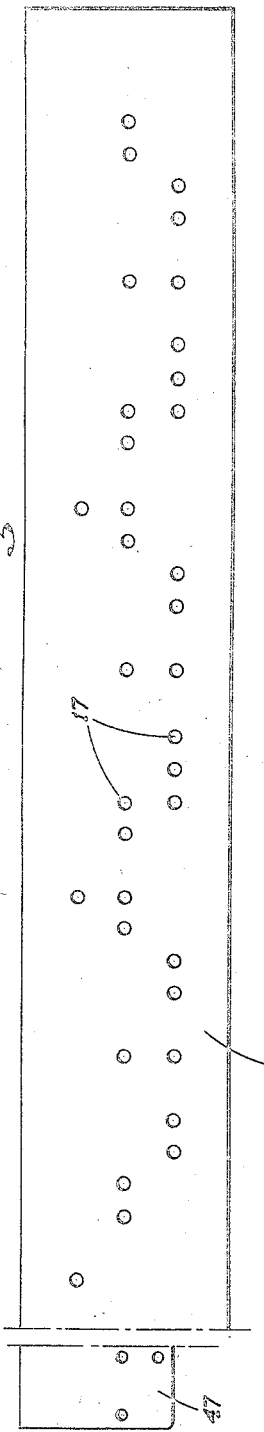
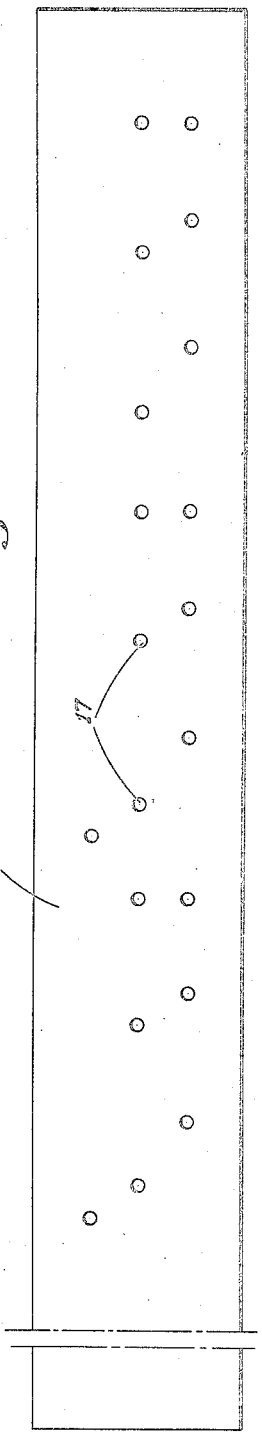
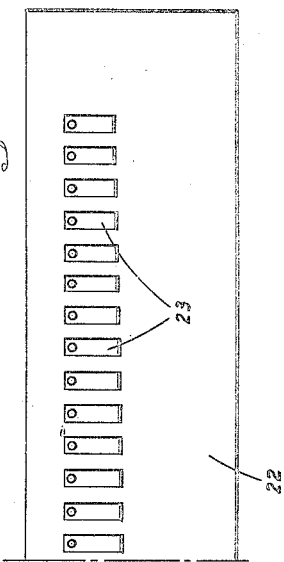
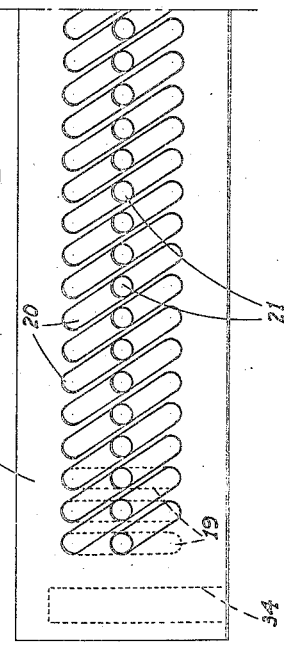
INVENTOR
*Merrill F. Abbott*
BY
ATTORNEYS Patented Feb. 7, 1950

2,496,511

UNITED STATES PATENT OFFICE 2,496,511

TRANSPOSING HARMONICA

Merrill F. Abbott, Sanitarium, Calif.

Application March 24, 1947, Serial No. 736,842

11 Claims. (Cl. 84—377)

This invention relates generally to a musical instrument and in particular relates to an improved alternate reed action harmonica.

The principal object of my invention is to provide a harmonica which is constructed in such a manner that when properly manipulated the instrument affords a playing selection throughout the entire diatonic scale and including accidentals as well as affording a playing selection of varying chords regardless of the particular key selected.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a top plan view of my improved harmonica.

Figure 2 is a front view of the same.

Figure 3 is a cross section taken on line 3—3 of Fig. 2.

Figure 4 is a fragmentary view of the rack for the key selector.

Figure 5 is a top plan of the slide actuating or control mechanism, detached from the casing of the instrument.

Figure 6 is a top plan view of the lower half of the body of the instrument.

Figure 7 is a cross section taken on line 7—7 of Fig. 2.

Figure 12 is a top plan view of the inner one of the lower slide plates.

Figure 13 is a top plan view of the outer one of the lower slide plates.

Figure 14 is a fragmentary top plan view of the lower slide block.

Figure 15 is a fragmentary top plan view of the lower reed plate.

Figure 9:
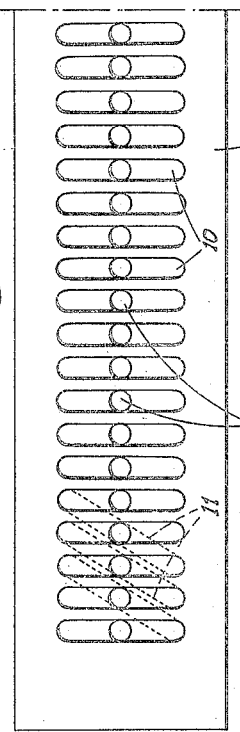
Figure 9 is a fragmentary top plan of the upper slide block.
Figure 8:
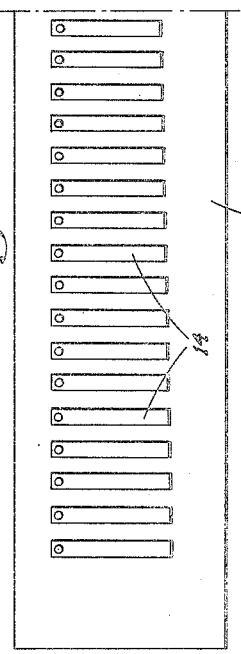
Figure 8 is a fragmentary top plan of the upper reed plate.
Figure 10:
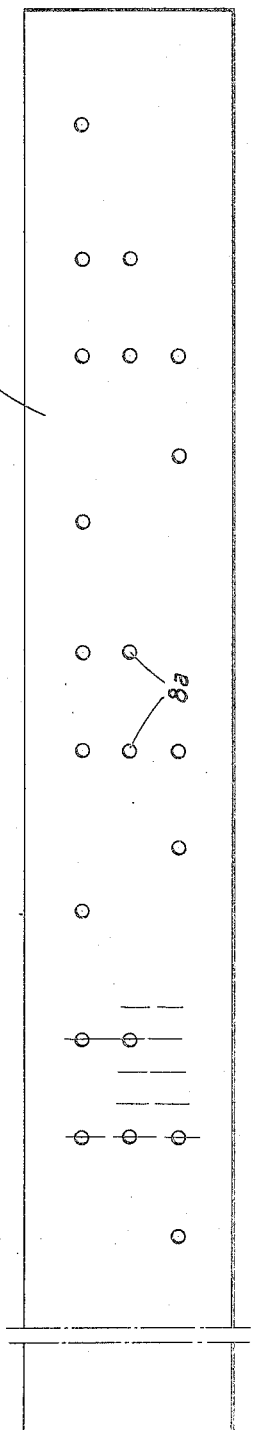
Figure 10 is a top plan of the outer one of the upper slide plates.
Figure 11:
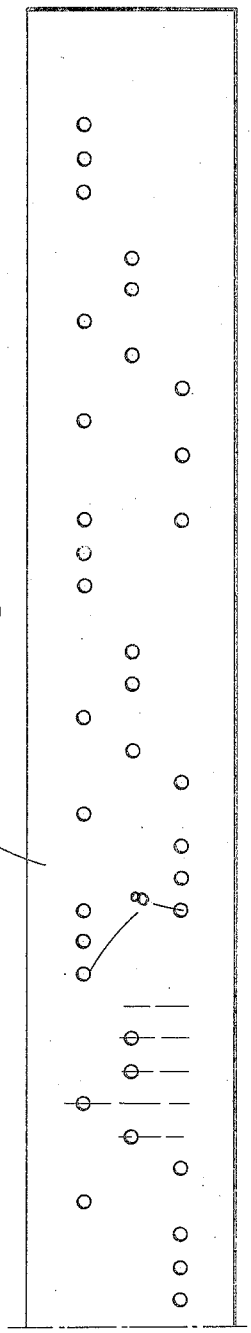
Figure 11 is a top plan of the inner one of the upper slide plates.

Referring now more particularly to the characters of reference on the drawings, the instrument comprises a relatively long body 1 having longitudinal channels 2 formed in the upper and lower faces thereof; such channels being rectangular in section. Intermediate the channels 2 the body is formed with a plurality of longitudinally spaced chambers 3 open top and bottom to the adjacent channels and in communication at their forward end with ducts 4 which all converge into a mouthpiece 5 which projects from the body and is of customary size. The body and mouthpiece are formed from a pair of complementary members, the lower one of which is shown in plan in Fig. 6.

A pair of relatively thin slide plates are disposed in contacting relation adjacent the bottom of the upper channel 2 between said channel and chambers 3, the inner or lower slide plate being indicated as 6 and the outer or upper slide plate as 7. These slide plates are each provided with a plurality of holes 8 and 8a respectively arranged in three laterally spaced rows, the holes in each row being so spaced that only certain of the holes in the plates will register when the plates are in any given relative position. The holes are spaced lengthwise of the plates according to multiples of units each of which represent a musical half-step and whose length has been arbitrarily determined. This unit spacing is also carried out in the cooperating elements of the instrument as will hereinafter be shown. The particular perforating of the slide plates so that only certain of the holes therein will register when the plates are in any given relative position is to selectively produce certain chord or harmony effects and chromatic changes.

A slide block 9 is slidably disposed in the upper channel 2 and rests on the slide plate 7, such slide block 9 having a plurality of transverse grooves 10 in its outer or upper face and a corresponding set of diagonal grooves 11 in its inner or lower face, each groove 11 extending across three of the grooves 10 and in communication with the intermediate one thereof by means of a passage 12. A reed plate 13, having blow reeds 14, rests on and is fixed to the slide block by suitable means; the reeds corresponding in number with grooves 10 and each reed being disposed in alinement with one such groove.

The chambers 3 are equal in width (taken longitudinally of the instrument) to three of the units or half-steps upon the multiples of which the perforating of the slides is based, grooves 10 being spaced apart from center to center a distance equal to one such half-step.

The lower channel 2 in the body 1 is fitted with the same elements as the upper channel and in the same relative positions and including an inner slide plate 15 and an outer slide plate 16, both plates having three laterally spaced rows of holes 17 spaced longitudinally thereof according to multiples of half-steps and in predetermined registering positions; a slide block 18 having transverse grooves 19 in its outer or lower face and diagonal grooves 20 in its inner or upper face and a passage 21 between corresponding grooves; and a reed plate 22 provided with draw reeds 23 fixed to the slide block 18. Both reed plates, other than the number of reeds in each, are of the same general construction as now used in harmonicas and the reeds are tuned to the consecutive tones of the chromatic scale.

The elements heretofore recited are maintained in place in the channels 2 by means of the following mechanism. A U-shaped yoke 24 is disposed about the body from the back and adjacent each end. An adjustable set screw 25 extends inward from each projecting leg of the yoke and engages a leaf spring 26 which is formed with pads 27 on each end, said pads frictionally engaging the reed plates and holding the same and other elements in the channels 2. Pins 28 are fixed in the slide blocks adjacent one edge and project loosely through holes in the adjacent portion of the yoke, said pins and yoke securing the slide blocks together for simultaneous sliding movement longitudinally. An inturned finger 29 is fixed on the upper portion of the yoke and engages the upper slide block whereby to stabilize the yoke and maintain it in proper position as otherwise the weight of the elements in the lower channel would tend to draw the yoke downward and would unbalance the tension placed by the set screws on the leaf springs.

A resonator case 30 surrounds the body and is provided at one end with a bell 31 and at the other with an enclosing cap 32 to enclose the selective control mechanism hereinafter described. The mouthpiece of course projects through one side of the case in the manner shown.

The key changing mechanism of the instrument comprises an arm 33 mounted transversely on one slide block and projecting through a longitudinal slot S in one side of the cap 32. The arm is slidable in a socket 34 in said one slide block and is held in place by means of a screw 35 projecting through an elongated slot 36 in the arm. A compression spring 37 in the bottom of the socket normally maintains the arm in an outwardly extended position but permits of some inward movement whereby to release a catch pin 38 on the arm from a rack 39 mounted in the case and disposed alongside the slot S. A finger engaging member 40 is secured on the outer end of the arm and a fixed finger 41 projects upward therefrom to a point adjacent a longitudinal perforated indicating and stop bar 42 having stop pins 43 adapted for removable engagement in any of the perforations. These are spaced a half-step apart, and are symmetrical in position to the notches of rack 39, which are similarly spaced.

To change the key in which the instrument is playing it is only necessary to press in member 40 releasing pin 38 from rack 39 and to then shift arm 33 in one direction or the other which causes both slide blocks 9 and 18 to slide in a corresponding direction along with the attached reed plates. This changes the position of the reed plates relative to the chambers 3 and ducts 4 which lead to the mouthpiece thus causing a key change. Of course, communication from the chambers 3 to the reed plates is afforded through the registering holes of the slide plates and registering diagonal grooves in the slide blocks which communicate with the transverse grooves on the other side of said slide blocks and which transverse grooves in turn register with the reeds of the reed plates. The stop pins 43 may be used in order to facilitate a key change from one position to another while playing and without the necessity of looking at the indicator bar.

To effect a change from one chord or harmony to another, the slide plates of each pair are shifted relative to each other; there being three positions into which they may be moved selectively whereby the instrument may be played— (1) in the regular diatonic scale, (2) in the natural minor scale with its two component chords, or (3) in the sub-dominant and minor sub-dominant chords. To obtain this transposing effect I have made a systematic arrangement of the chromatic scale, such arrangement being embodied in the particular perforating of the slide plates whereby when the slides are in any given relative position, to afford playing communication with certain reeds of the reed plates.

Also, by shifting both pairs of slide plates simultaneously a predetermined distance (one half-step, the unit of spacing used throughout the instrument) in a longitudinal direction, the "accidental tones" (sharps and flats) may be obtained. Such shifting of the slide plates raises the pitch one half-step and brings into play the corresponding reeds of the reed plate.

The shifting of the slide plates of each pair relative to each other in order to effect chromatic or harmony changes, and the simultaneous shifting in order to raise the pitch is accomplished by use of the following mechanism:

The slide plates project beyond the left hand end of the body, and an L-shaped arm 44 is secured with its lower leg fixed between the end portions of the outer slide plates 7 and 16, an adjusting screw 45 extending lengthwise through said leg and being threaded into the adjacent end portion of the body 1. A compression spring 46 is disposed about the screw between the end of the leg and the adjacent end portion of the body. The inner slide plates are formed at their corresponding end with offset projections 47, a block 48 being fixed between said projections thus securing the inner plates for movement together. An L-shaped control lever 49 is pivoted at one end between the projections and extends through a forked portion on the upper end of arm 44. A finger piece 50 is formed on the upper end of lever 49 and is disposed exteriorly of cap 32, the upper end of lever 49 projecting through a longitudinal slot in the cap. A cross pin 51 extends between said forked portions and passes through a slot 52 in lever 49, the lower edge of the slot being formed with three stepped and longitudinally spaced notches 53. A spring 54 is pivoted between block 48 and the lower end of control lever 49 and normally urges the lever into seating engagement with any one of the notches 53. An adjustment screw 55 extends transversely through the vertical leg of the L-shaped arm 44 and is threaded into block 48, a compression spring 56 on the exterior or projecting portion of screw 55 normally maintaining the inner slide plates advanced as far as possible toward the arm while spring 46 normally maintains the arm 44 at a predetermined and adjustable point from the end of the body, thus holding the outer slide plates also in a predetermined position. In the above manner all the slide plates may be disposed in proper matching relationship to accomplish the desired results.

When the control lever 44 is in the position shown in dotted lines in Fig. 5, the holes in the four slide plates are so registering that the harmonica will play in the regular diatonic scale. However when it is desired that the harmonica play in either one of the other possible harmonies or chords as heretofore described, the control lever is both depressed and advanced, and then allowed to raise thus engaging cross pin 51 in either the intermediate notch or the other end notch depending on which position is desired and the amount of movement. With such movement the inner slide plates shift relative to the outer slide plates bringing into register other of the holes establishing communication with those certain reeds which produce the desired chord.

In the event that it is desired to have the harmonica play the accidental tones or halftones, the lever 44 is merely shifted toward the bell end of the instrument, such movement being limited to an amount equivalent to one half-step relative to the reeds. This simultaneously moves all four slide plates such distance and although it maintains them in the same relative position, it does raise the pitch one half-step. It is therefore possible to so raise the pitch regardless of the particular key for which the harmonica is set or the particular chord or harmony adjustment.

The instrument as described herein is thus so arranged that the selector or transposing mechanisms will, with proper manipulation, provide a playing range including the diatonic scales, both major and minor, as well as various common and much used chords. For this reason, my instrument embodies material advantages over other known harmonicas which have a very limited playing range requiring a player to have several separate instruments in order to play in a range such as with my instrument.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a harmonica including a body having a plurality of longitudinally separated wind chambers all being initially open along one side, a pair of engaged slide plates mounted on the body over and enclosing the open side of the chambers, said slide plates each being perforated according to a systematic arrangement, the perforations through each plate being arranged in laterally spaced rows and the perforations in each row being longitudinally spaced apart according to multiples of units of predetermined length, the unit length representing a musical half-step, whereby when the plates are in any given relative position certain of the perforations will be in register and above certain of the chambers; a reed plate disposed outward of the slide plates and including reeds spaced apart a distance equal to such predetermined unit length, means to shift one of the slide plates longitudinally relative to the other, means to establish communication between the registering perforations of the slide plates and certain reeds of the reed plate, and means to simultaneously shift the slide plates one unit length without altering their relative positions whereby to raise the playing pitch of the instrument one musical half-step.

2. A device as in claim 1 in which said means for establishing communication between the registering perforations of the slide plates and certain reeds of the reed plate comprises a slide block disposed between the outer slide plate and reed plate, said slide block having grooves in its face adjacent the slide plate each adapted to register with certain of the registering perforations in the slide plates, and having corresponding grooves in the face adjacent the reed plate to register with the corresponding reeds; the slide block having a plurality of passages establishing communication with the corresponding grooves on each side of the slide block.

3. A device as in claim 1 in which said means for establishing communication between the registering perforations of the slide plates and certain reeds of the reed plate comprises a slide block disposed between the outer slide plate and reed plate, said slide block having diagonal grooves in its face adjacent the slide plate, said grooves extending across an area longitudinally of the body equal to three unit lengths, the chambers likewise being of a width equal to three unit lengths, the slide block having corresponding transverse grooves in the face adjacent the reed plate, each such groove registering with one reed; there being openings establishing communication between corresponding diagonal and transverse grooves.

4. In a harmonica including a body having a plurality of longitudinally separated wind chambers all being initially open along one side, a pair of engaged slide plates mounted on the body over and enclosing the open side of the chambers, said slide plates each being perforated according to a systematic arrangement, the perforations through each plate being arranged in laterally spaced rows and the perforations in each row being longitudinally spaced apart according to multiples of units of predetermined length, the unit length representing a musical half-step whereby when the plates are in any given relative position certain of the perforations will be in register and above certain of the chambers; a reed plate disposed outward of the slide plates and including reeds spaced apart a distance equal to such predetermined unit length, means to shift one of the slide plates longitudinally relative to the other, a slide block disposed between the outer slide plate and reed plate, the reed plate being fixed on said slide block, said slide block including means to afford communication between registering perforations of the slide plates and certain of the reeds and means to shift the unitary slide block and reed plate relative to the slide plates.

5. A device as in claim 4 including means to selectively shift one of the slide plates longitudinally relative to the other slide plate, or to simultaneously shift both slide plates relative to the slide block.

6. In a harmonica including a body having a plurality of longitudinally separated wind chambers initially open on opposite sides, a blow reed plate disposed outward of the chambers on one side, a draw reed plate disposed outward of the chambers on the other side, a pair of contacting slide plates disposed between each reed plate and the chambers, said slides each being perforated according to a systematic arrangement; means connecting the inner slides of each pair together for simultaneous sliding movement as a unit, and other means connecting the outer slides of each pair together for simultaneous sliding movement as a unit.

7. A device as in claim 6 including a lever connected to one unit to shift the same, and including means to selectively engage the other slide plate unit with the lever whereby both units may be shifted together.

8. A device as in claim 6 including slide blocks disposed between the slide plates and reed plates and secured to the latter, said slide blocks having longitudinally separated passages to establish communication between the reed plates and registering perforations of the slide plates, and means connecting said blocks together for simultaneous shifting movement and including a control lever.

9. In a transposing harmonica which includes a body having a plurality of longitudinally separated wind chambers open along both sides and a separate reed bank slidably disposed over each side of said chambers and being in communication with said chambers; a means for connecting said reed banks together for simultaneous sliding movement relative to the body, such means comprising a substantially U-shaped yoke encompassing the body at each end and overhanging the adjacent ends of the reed banks, each such yoke carrying a set screw, a yieldable member engaging each end of each reed bank and such set screws engaging said yieldable members, and means loosely connecting each reed bank with the yokes.

10. A combination as in claim 9 including means connected with one of the reed banks and operative to slide it along the body.

11. A combination as in claim 10 in which the last named means includes a push arm yieldably mounted in said one reed bank, a catch pin on the arm, and a rack mounted on the body and engageable by the catch pin.

MERRILL F. ABBOTT.

REFERENCES CITED

The following references are of record in the file of this patent:

UNITED STATES PATENTS

| Number | Name | Date |
|---|---|---|
| 443,607 | Oefinger et al. | Dec. 30, 1890 |
| 2,137,251 | Steele | Nov. 22, 1938 |
| 2,179,993 | Davies | Nov. 14, 1939 |
| 2,252,236 | Steele | Aug. 12, 1941 |

FOREIGN PATENTS

| Number | Country | Date |
|---|---|---|
| 192,375 | Germany | Nov. 28, 1907 |
| 352,163 | Germany | Apr. 21, 1922 |